(No Model.)
A. B. McCLORY.
SAFETY SNAP HOOK.
No. 582,220. Patented May 11, 1897.
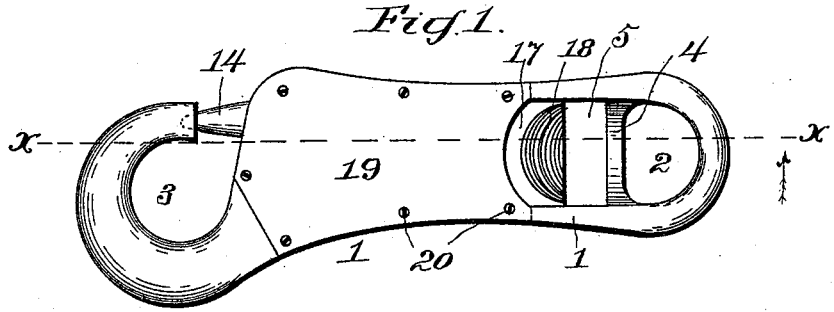
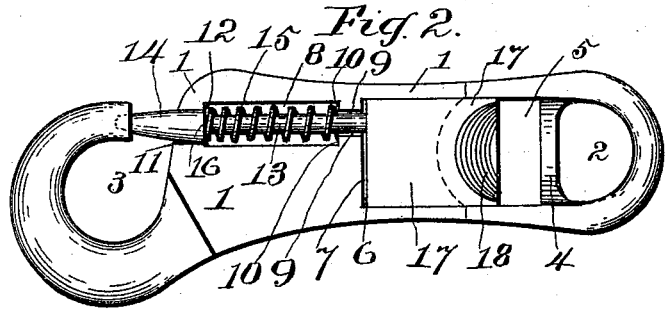
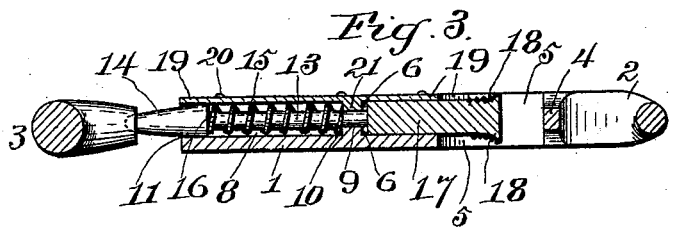
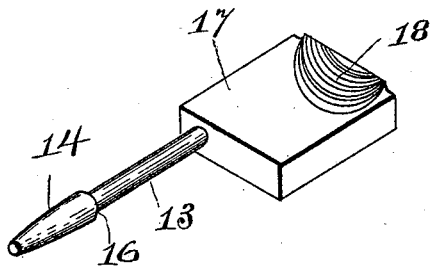
Witnesses:
Inventor:
Andrew Bigler McClory
By W. H. Wills
Atty

UNITED STATES PATENT OFFICE.

ANDREW BIGLER McCLORY, OF NEAR WINTERS, CALIFORNIA.

SAFETY SNAP-HOOK.

SPECIFICATION forming part of Letters Patent No. 582,220, dated May 11, 1897.

Application filed August 8, 1896. Serial No. 602,200. (No model.)

*To all whom it may concern:*

Be it known that I, ANDREW BIGLER MC-CLORY, a citizen of the United States, residing in the county of Yolo, State of California, near the town of Winters, in said county, which said town is my post-office, have invented a new and useful snap to be used upon harness, bridles, and wherever a snap would be convenient, of which the following is a specification.

This invention relates to snap-hooks; and the object of the invention is to provide a snap-hook of improved and novel construction and arrangement of parts.

In the accompanying drawings, forming part of this application, Figure 1 is a plan view of my improved snap-hook. Fig. 2 is a similar view with the cap or cover removed. Fig. 3 is a section on the line $x\,x$, Fig. 1. Fig. 4 is a perspective view of the snap-bolt.

The same numeral references denote the same parts throughout the several figures of the drawings.

The body 1 of the snap-hook has the usual link 2 at the rear end and a hook 3 at the front end. One side of said rear link is formed by a cross-arm 4, and just forward of this arm is an opening 5, extending entirely through said body.

A rectangular cut-out 6 extends from the opening 5 forward to an abutment 7, and forward of said abutment is formed a recess or cavity 8, connected with the said rectangular cut-out 6 by a slot 9, forming shoulders 10. A similar slot 11 extends from the front end of the cavity, which has a shoulder 12.

The snap-bolt 13 has a conical end 14 to engage a recess in the end of the hook 3. Said bolt works through the slot 9, and said conical end through a slot 11. The bolt is controlled by a spring 15, surrounding the bolt and located in the cavity 8 between the shoulders 10 and the shoulder 16 of the bolt. The bolt 13 has a rectangular head 17, fitting the rectangular cut-out 6 and provided with a hand-grasping portion 18, whereby the bolt may be retracted to open the entrance to the hook 3 until it is stopped by the cross-arm 4, the said bolt being retracted to normal or closed position by the spring 15.

A cap or cover 19 is secured upon the body of the snap-hook by screws 20 and has a lug or projection 21, fitting in the slot 9, to keep the bolt 13 in said slot.

It will be observed that the cap or cover completely covers the working parts of the snap-hook and fully protects the interior of the hooks from dust, dirt, or other foreign matter which might interfere with the working of the bolt. The said cap can be readily removed in order to repair or renew any of the parts.

Having thus described my invention, what I claim as new, and desire to secure by Letters Patent, is—

In a snap-hook, the combination with the body having a cut-out, and a cavity connected by a slot, of a spring-controlled bolt working through the cavity and slot and having an enlarged head slidable in the cut-out, and a cap or cover having a lug or projection fitting the slot and engaging the said bolt, as set forth.

ANDREW BIGLER McCLORY.

Witnesses:
FRANCIS M. HAUKERS,
O. P. FASSETT.